United States Patent [19]

Pedneault

[11] Patent Number: 4,696,739
[45] Date of Patent: Sep. 29, 1987

[54] WATER PURIFICATION APPARATUS

[75] Inventor: John A. Pedneault, Bohemia, N.Y.

[73] Assignee: Aqua Strip Corporation, Somers, N.Y.

[21] Appl. No.: 894,748

[22] Filed: Aug. 11, 1986

Related U.S. Application Data

[63] Continuation of Ser. No. 595,619, Apr. 2, 1984, abandoned.

[51] Int. Cl.$^4$ .............................. C02F 1/78; C02F 9/00
[52] U.S. Cl. .................... 210/121; 210/192; 210/199; 210/201; 210/221.2; 210/266
[58] Field of Search .............. 210/620, 631, 669, 694, 210/758, 760, 121, 192, 199-202, 205, 220, 221.1, 221.2, 253, 255, 257.1, 259, 266; 261/125

[56] References Cited

U.S. PATENT DOCUMENTS

| | | | |
|---|---|---|---|
| 3,054,602 | 9/1962 | Proudman | 210/201 |
| 3,455,820 | 7/1969 | Joyce et al. | 210/694 |
| 3,563,888 | 2/1971 | Klock | 210/201 |
| 3,822,788 | 7/1974 | Dunkers et al. | 210/200 |
| 3,945,918 | 3/1976 | Kirk | 210/41 |
| 4,007,118 | 2/1977 | Ciambrone | 210/63 |
| 4,081,365 | 3/1978 | White et al. | 210/694 |
| 4,098,691 | 7/1978 | Filby | 210/29 |
| 4,141,830 | 2/1979 | Last | 210/632 |
| 4,156,652 | 5/1979 | Wiest | 250/527 |
| 4,160,724 | 7/1979 | Laughton | 210/7 |
| 4,172,034 | 10/1979 | Carlsson et al. | 210/620 |
| 4,219,424 | 8/1980 | Tamura et al. | 210/255 |
| 4,237,002 | 12/1980 | Strudgeon et al. | 210/669 |
| 4,252,654 | 2/1981 | Leitzke et al. | 210/760 |

FOREIGN PATENT DOCUMENTS 4490 6/1901 Austria .............. 261/125

Primary Examiner—Ivars Cintins
Attorney, Agent, or Firm—Michael J. McGreal

[57] ABSTRACT

This apparatus and method consists of serially or in parallel of contacting a contaminated water countercurrently with air, preferably containing ozone, to remove dissolved organics from the water. It is also desirable to pass the treated water through a carbon adsorbent bed prior to use.

5 Claims, 4 Drawing Figures

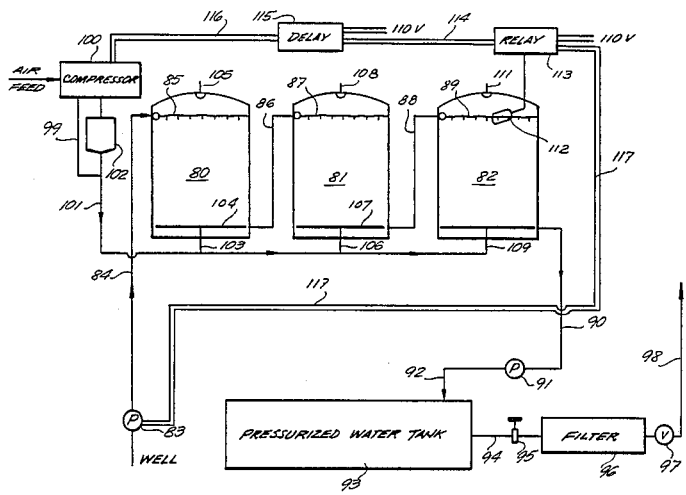

WATER PURIFICATION APPARATUS

This is a continuation of application Ser. No. 595,619, filed Apr. 2, 1984, now abandoned.

This invention relates to an apparatus for removing contaminants from water. More particularly, this invention relates primarily to an apparatus for removing dissolved organic contaminants from water.

Many homes, businesses and communities rely on underground water for their fresh water supply. By drilling wells to various depths this underground water which is in underground aquifers is tapped and used. This is generally a pure water source, although it may have a relatively high mineral content. That is, the water may be what is commonly termed "hard water". High mineral contents, although bothersome, do not make a water unuseable. However, if this water contains measurable levels of organics, it can for health reasons, be considered unuseable for human consumption. These organic contaminants are the result of our modern way of life. Organic chemicals have been disposed of by depositing them in landfills or by letting them seep into the ground and air from waste lagoons. Gasoline has entered the ground water from corroded underground storage tanks. A corroded tank can leak five or more gallons per day into the ground. This leakage is usually not discovered until hundreds of gallons have leaked into the ground.

The result of ground water contamination is that a well which once yielded pure water now only produces contaminated water. Aquifers have been polluted with amounts of organics which make the water under a large area unuseable. However, in many cases the pollution only affects a small area.

The present invention is directed primarily to cleaning up a water supply for single residences and businesses. When a residence or business puts the present water decontaminating apparatus in-line between the well water source and the residence or business plumbing, the dissolved organic content can be fully removed or, at least, reduced to acceptable use levels. The apparatus can also be engineered to destroy bacteria and to reduce the mineral content of the water. The present invention can also be used for large scale operations to take polluted water from an aquifer, clean it, and inject cleaned water back into the aquifer.

The present invention consists of an apparatus and method for stripping organics from a contaminated water. Air, optionally containing ozone, is bubbled countercurrently through the contaminated water. In one embodiment the contaminated water flows through a series of columns with air flowing countercurrently in each column. This air can be added to the last column in the series and flowed countercurrent to the water in each column, exiting from the first column, or in the preferred embodiment, air is added to each column and flows countercurrent to the water. The water after treatment flows to a reservoir. In a second embodiment the contaminated water flows through a parallel arrangement of columns with the air flowed into each column countercurrent to the contaminated water flow. In this second embodiment air can flow from one column into another; however, it is preferred that fresh air be flowed into each column. The air can also optionally contain ozone. In either the first or second embodiment, there can be a container of adsorbent, preferably a carbon adsorbent, between the last column and the reservoir.

The present apparatus and method for removing contaminants from water will be discussed in more detail with reference to the following drawings.

The apparatus and process will be described in more detail with reference to the drawings.

In each of the drawings there is an impure input water. The impurity which is to be removed is a substance having a volatility greater than water. Typically these are organics such as benzene, toluenes, xylenes and paraffinic hydrocarbons of from 4 to 8 carbon atoms. These are also the primary components of gasoline which is the main contaminant of ground water. Leaking storage tanks at service stations are allowing thousands of gallons of gasoline to enter the groundwater which is the source of drinking water for many individuals. A single gallon of gasoline can pollute up to 750,000 gallons of groundwater. The apparatus and processes described in these drawings can make such a groundwater once again useable.

Figure 1:
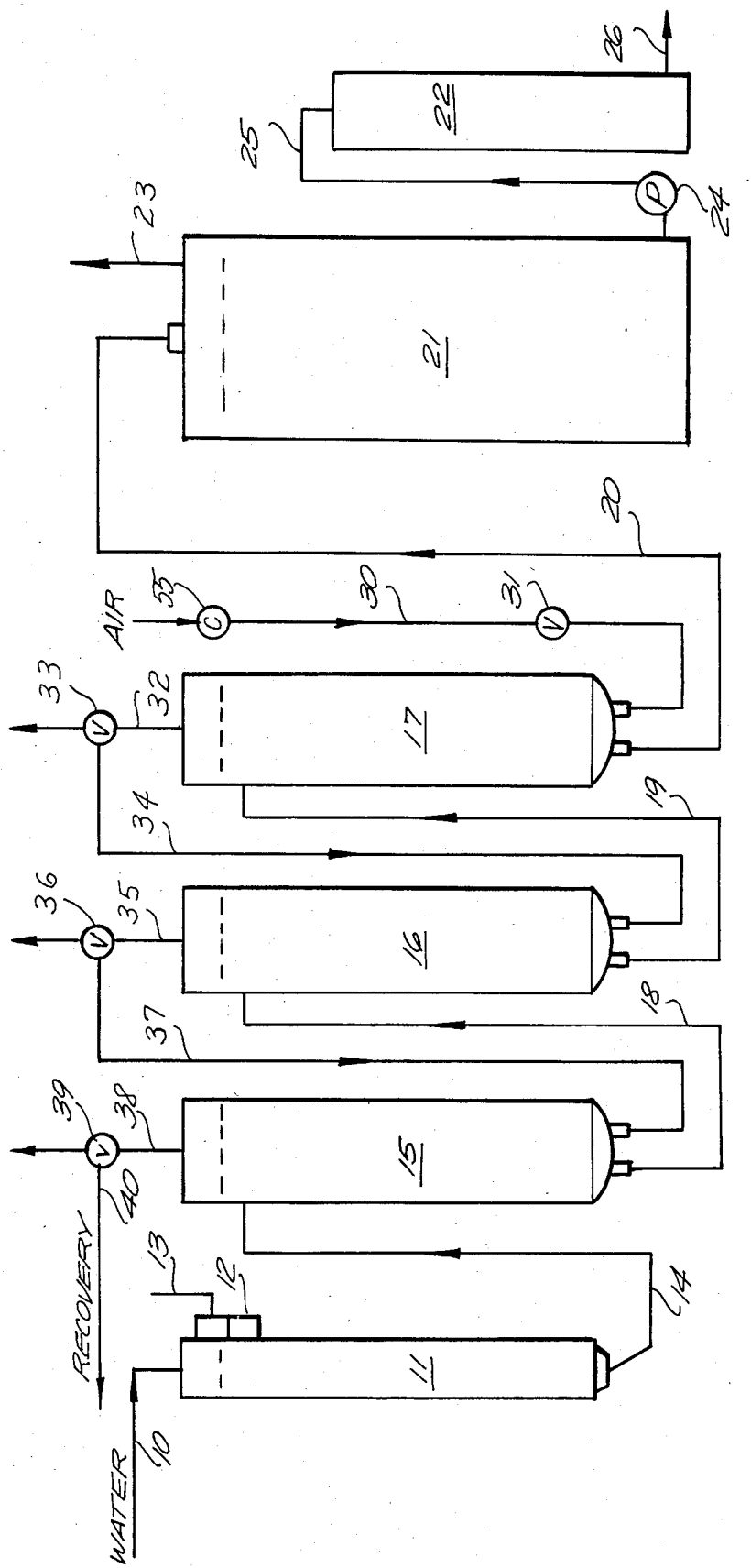
FIG. 1 is a schematic design of the apparatus and process with the air entering the last stripper chamber and flowing countercurrent to the water to be treated which enters the first stripper chamber (series water flow).

More specifically, FIG. 1 shows a series arrangement for the contact of a polluted water with air. The polluted water enters through conduit 10 into an optional holding reservoir 11. This reservoir functions to moderate the flow through the apparatus. Usually the water in conduit 10 is water being pumped from a well. Switch 12 senses the level of water in reservoir 11 with the output of the switch passing via line 13 to a relay to turn off the well pump.

When water is being used in the home, the water level drops in reservoir 11 which turns on the well pump or opens a valve to permit water to flow into reservoir 11. Water then flows from reservoir 11 through conduit 14 into stripper chamber 15. The water passes downwardly and is contacted with air which passes upwardly. That is, there is a countercurrent flow of the water and air.

The air enters the apparatus by passing into the last stripper chamber 17 and passing via conduits to the first stripper chamber 15. That is, it passes from the least polluted water to the most polluted water. This air enters stripper chamber 15 through conduit 37. The air after passing upwardly through stripper chamber 15 exits via conduit 38 and passes by way of valve 39 to the atmosphere or by conduit 40 to vapor recovery.

The water, after passing downwardly through stripper chamber 15, passes through conduit 18 to stripper chamber 16. This water passes downwardly through this stripper chamber 16 countercurrent to the flow of air which passes upwardly, entering stripper chamber 16 through conduit 34. This air bubbles upwardly through stripper chamber 16 and exits through conduit 35 located on the upper portion of stripper chamber 16. This air passes through valve 36 into conduit 37, although it is possible to also have the air pass to the atmosphere at this point. The water being treated flows downwardly and exits stripper chamber 16 through conduit 19 and passes into the upper portion of stripper chamber 17. The water being treated again flows downwardly while air is bubbled upwardly. The water being treated exits stripper chamber 17 through conduit 20 and passes to storage tank 21. This storage tank has a vent 23 to the atmosphere. The air to stripper chamber 17 enters through conduit 30 which has an in-line valve 31. A conventional air pump 55 supplies air under pressure to conduit 30. The air, after bubbling through stripper chamber 17 exits at line 32, and flows through valve 33 to conduit 34. Optionally, some of the air can be bled to the atmosphere through valve 33.

The water, now free of dissolved volatile organics, is stored in tank 21 until there is a demand for the water. At that time, water pump 24 is activated and water flows under pressure through conduit 25 to and through an adsorbent containing chamber 22 and into the regular water delivery plumbing 26. The adsorbent 22 is an option and need not be used. However, it will function to remove some trace organics, serving as a safety feature, and when the input air contains ozone, the adsorbent will function to remove oxidized minerals which are adsorbable on carbon adsorbents. There is thus the advantage of the apparatus additionally functioning to soften water, as well as to remove organics.

Figure 2:
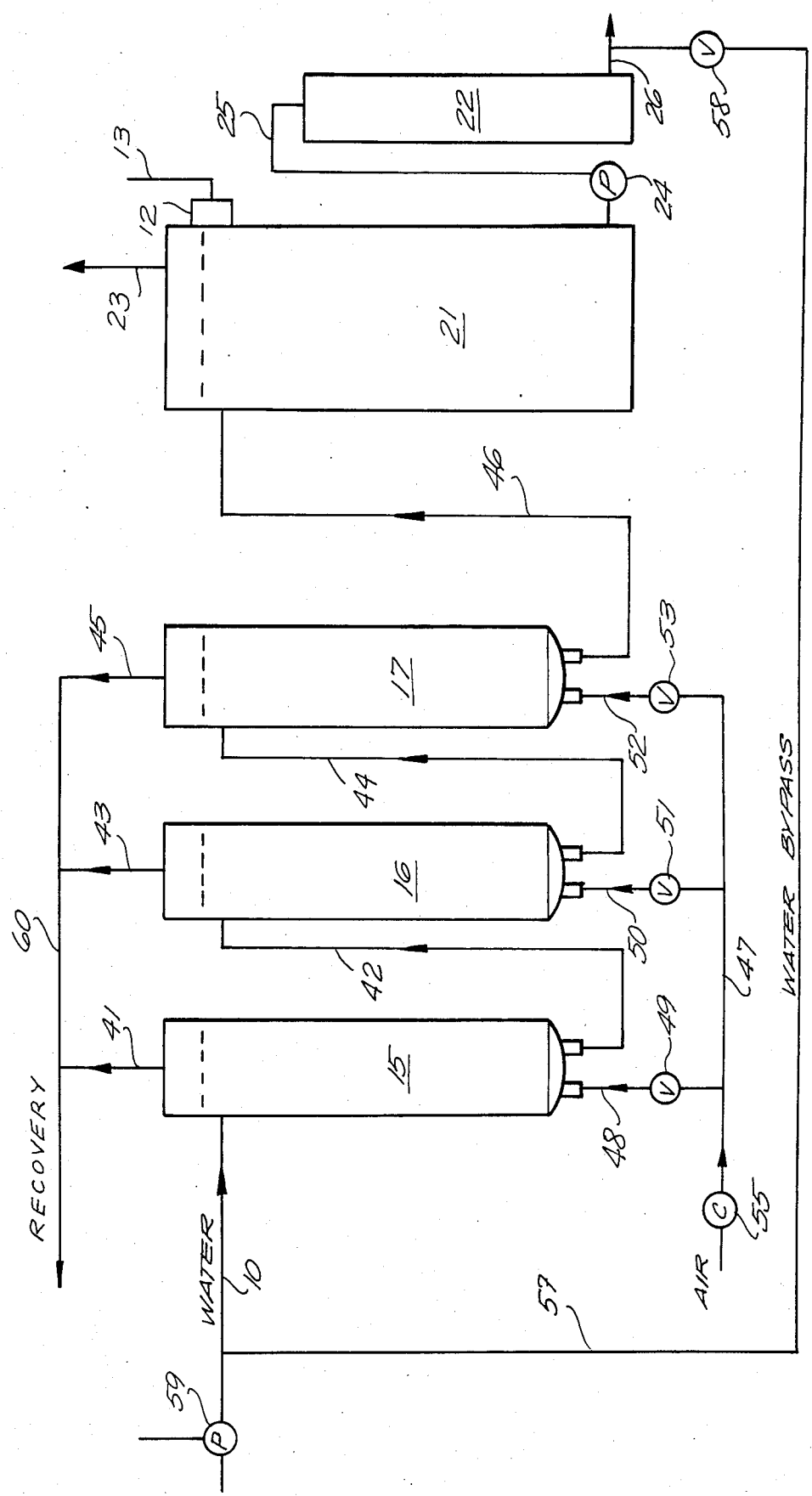
FIG. 2 is a schematic design of the apparatus and process with air entering each stripper chamber and flowing countercurrent to the water to be treated which enters the first stripper chamber (series water flow).

The apparatus of FIG. 2 is similar in many ways to that of FIG. 1. Whereas in FIG. 1 the air flowed serially through each stripper chamber countercurrent to the water, in FIG. 2 fresh air flows into the bottom portion of each stripper chamber and exits to the atmosphere from the upper portion of each stripper chamber. This FIG. 2 apparatus will provide more stripping than the FIG. 1 apparatus since the fresh air in each stripper chamber will remove more volatile organics. The input water to be treated flows under pressure through conduit 10 directly into stripper chamber 15. This water can bypass treatment via conduit 57 and valve 58. The bypass would be used when the equipment is being repaired or for emergency use in a fire sprinkler system. The stripping air to the apparatus is fed under pressure from compressor 55 through air manifold 47 and into each stripper chamber. The air to stripper chamber 15 passes through valve 49 and conduit 48 and into the stripper chamber. The air bubbles upward through the water and exits at 41 to vapor recovery manifold 60. The water passes from stripper chamber 15 via conduit 42 and into stripper chamber 16. The stripping air enters stripper chamber 16 through valve 51 and associated conduit 50, and exits to vapor recovery manifold 60 through conduit 43. The water, after treatment in stripper chamber 16, flows via conduit 44 into stripper chamber 17, where it undergoes further contact with stripping air. The stripping air enters stripper chamber 17 through valve 53 and associated conduit 52, and exits to the vapor recovery manifold through conduit 45. The treated water then flows through conduit 46 into storage tank 21. The remaining parts of the apparatus are the same as in FIG. 1. In this embodiment the storage tank 21 has water level controller 12. When the water reaches a set level in the storage tank the water pump 59 is tuned off by the water level controller, and when the water level drops the pump is activated.

Figure 3:
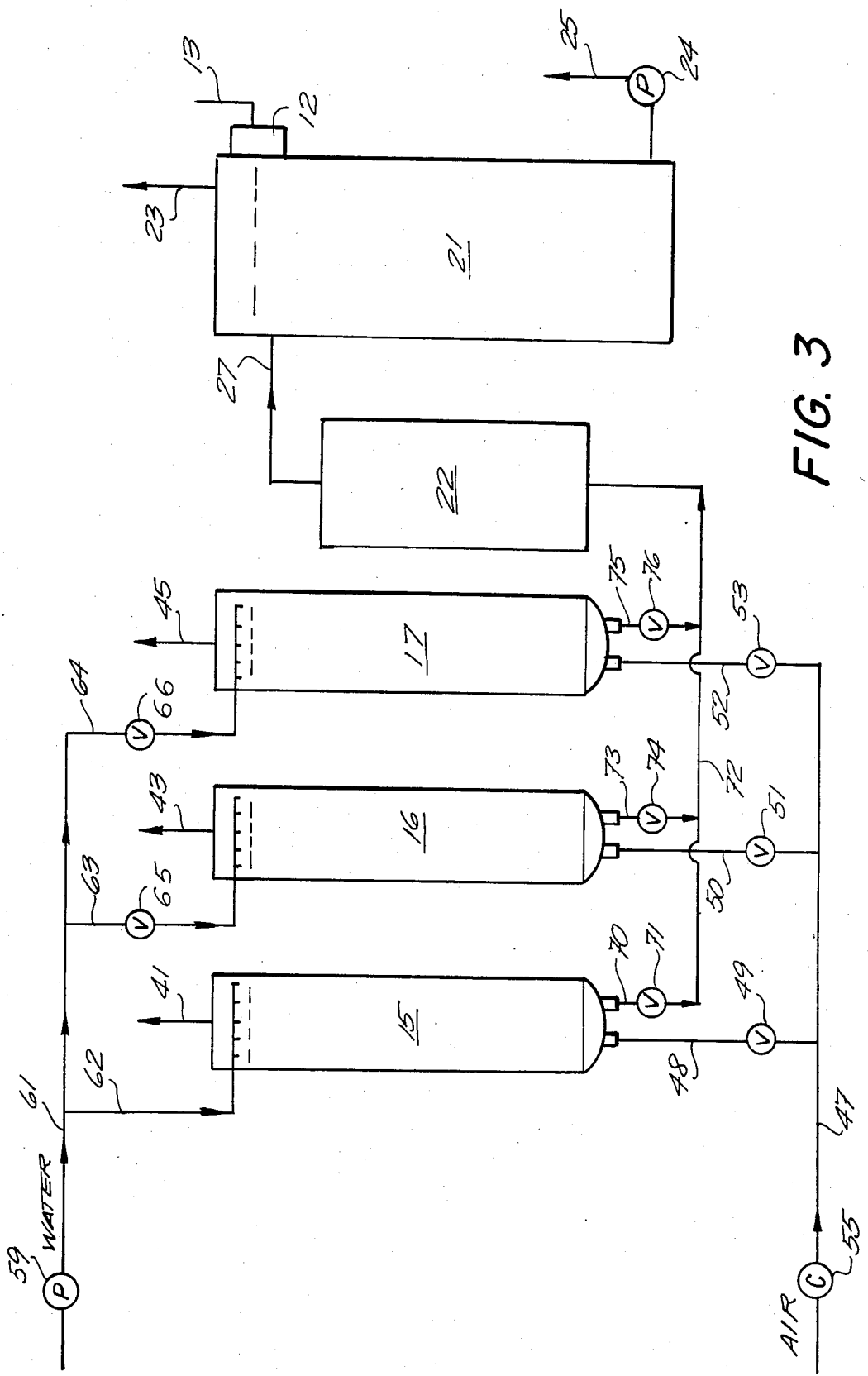
FIG. 3 is a schematic design of the apparatus and process where the water to be treated flows into the top of each stripper chamber and the air into the bottom of each stripper chamber with the water being treated in only one stripper chamber (parallel water flow).

The apparatus of FIG. 3 shows the embodiment where both the air and the water are flowed into each stripper chamber. That is, in FIG. 2 the stripping air flows from the manifold 47 and via separate conduits into each stripper chamber. In this FIG. 3 embodiment the water flows in a like fashion resulting in the water only being treated in a single stripper chamber. This arrangement is useful where the water contains low levels of dissolved volatile organics. Also in this FIG. 3 apparatus, the adsorbent chamber is shown located prior to the storage tank. This is an option in each embodiment.

The delivery system for the stripping air is the same as the apparatus of FIG. 2 and will not be discussed in detail with reference to FIG. 3. In FIG. 3, the water is delivered under pressure of pump 59 into manifold 61. Input water flows from this manifold into each stripper chamber. Conduit 62 flows the input water into stripper chamber 15. Water manifold 61 also feeds water via valves 65 and 66 and conduits 63 and 64 into stripper chambers 16 and 17 respectively. As water flows into each of these stripper chambers, air is bubbled upwardly through each stripper chamber exiting to the atmosphere at the top of each stripper chamber as in FIG. 2. The water from each stripper chamber flows into main conduit 72, through adsorbent chamber 22 and then through conduit 77 and into storage reservoir 21. The water from stripper chamber 15 exits through conduit 70, passes through valve 71 and enters main conduit 72. The water from stripper chamber 16 in like fashion exits through conduit 73, passes through valve 74 and into main conduit 72. The water from stripper chamber 17, again in like fashion, exits through conduit 75, passes through valve 76 and enters main conduit 72. One or more of these stripper chambers can be turned-off by closing valves 71, 74 and/or 76. The air supply to the stripper chambers which are not being used would also be turned-off by closing the appropriate input valve 49, 51 and/or 53. The flow of water in the apparatus is controlled in the same manner as in FIG. 2.

Figure 4:
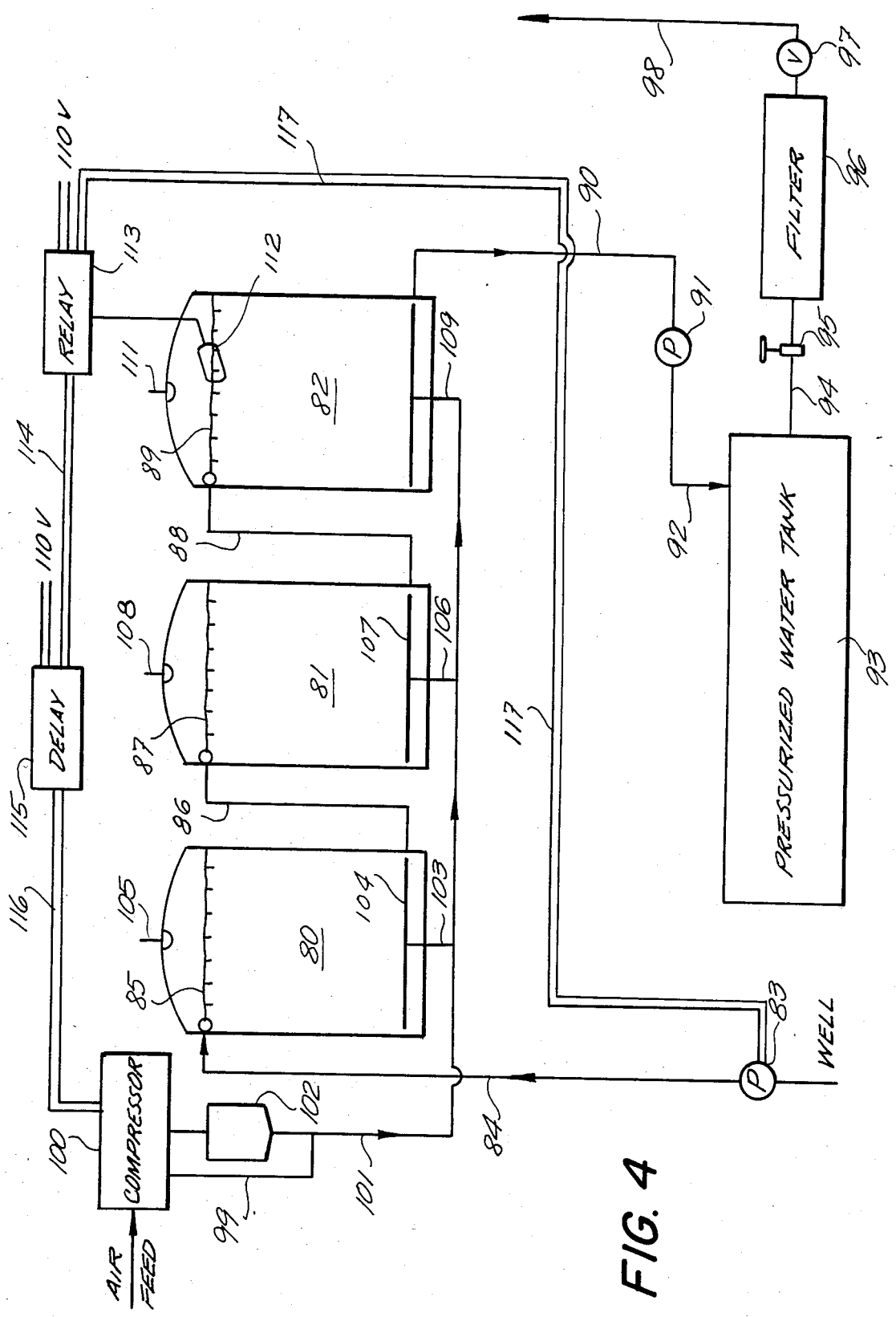
FIG. 4 is a schematic design of an apparatus incorporated into the plumbing of a residence (series water flow).

FIG. 4 shows a two stripper chamber unit integrated into a typical residential water system. This unit uses the embodiment of FIG. 2 where the water being treated flows from the first stripper chamber to the second stripper chamber and fresh stripping air containing ozone is fed to each stripper chamber. Also shown in this system is flowing air into the storage reservoir. This prevents the growth of bacteria in the storage reservoir and also permits exterior installation in cooler climates. Bubbling air through the water in the stripper chambers and the storage reservoir will prevent the water from freezing in these units.

In more detail pump 83 flows water under pressure through conduit 84 to water distributor 85 in stripper chamber 80. Air compressor 100 feeds air to ozone generator 102. Part of this fed air can bypass ozone generator 102 and flow directly to manifold 101. Air flows from air manifold 101 through conduit 103 to the microporous air distributor 104. This is typically a glass fit. The air flows up through the water in bubble form and exits to the atmosphere at conduit 105. The water being treated exits the stripper chamber through conduit 86 and enters stripper chamber 81 through water distributor 87. Pressurized air is fed to this stripper chamber through conduit 106 and air distributor 107. The air exists to the atmosphere through conduit 108.

The water then passes from this stripper chamber through conduit 88 and enters storage reservoir/stripper chamber 82 through water distributor 89. Pressurized air enters through conduit 109 and air distributor 110 and exits to the atmosphere through conduit 111.

The water is maintained at a set level in this storage reservoir/stripper chamber by means of float switch 112. This float switch senses the water levels and through relay 113 controls the operation of air compressor 100 and water pump 83. The relay is connected to the water pump switch via line 117 and to the air compressor switch through line 114, time delay 110 and line 116. The water level will be the same in each chamber since they are interconnected.

Water is drawn for use from storage/stripper chamber 82 by pump 91 through conduit 90. This pump maintains a set pressure of between about 30 psi to 60 psi in pressurized water tank 93. As there is demand in a residence for water, this water flows through conduit 94, on-off valve 95, filter 96, second on-off valve 97 and through the house plumbing 98. Valves 95 and 97 are a convenience so that the filter can be isolated for servicing. There are many possible modifications which can be made in the interfacing of the present water purification apparatus into a home. However, these are not pertinent to this apparatus and will not affect the operation of this apparatus.

These figures show several embodiments of a compact water purification apparatus. Each embodiment uses air stripping, and the countercurrent contacting of water with air. The stripper chambers have an internal diameter of about 3 inches to 36 inches. The length of each stripper chamber will be 3 feet to 25 feet. In the preferred embodiment the stripper chambers will have a length/internal diameter ratio of about 3:1 to about 20:1. The greater the length/internal diameter ratio, the greater the residence time of an air bubble in a stripper and, consequently, the greater the removal of disolved organics. These stripper chambers can be made of any convenient material such as glass, plastic or metals. The tank 11 and storage reservoir 21 can also be constructed of these same materials. The water and air conduits will either be plastic or metal.

The input air into a stripper chamber passes through a disperser prior to being injected into the water. Suitable dispersers consist of any material having holes of a thousandth of an inch or less. Glass frit and similar materials make good air dispersers. The objective is to make micro bubbles of the size found in carbonated beverages and have these micro bubbles travel upwards through a stripper chamber. The disperser also functions to distribute air bubbles across the diameter of the stripper chamber to maximize the contact between the air and water.

The residence time of the water being treated in a stripper chamber will range from about 30 seconds to 5 minutes or more. The needed residence time will depend on the content of dissolved organics, water temperature, the number of strippers and the size of the strippers. The amount of water which is treated daily will range upward from 200 gallons per day. An average residence will use from 75 to 100 gallons per day per resident. A commercial establishment will use water in volumes of thousands of gallons per day.

Various parts of the overall apparatus are known in the art. The water flow controller designated as 12 and having an output lead 13 senses the water level in the area of the controller. When the water level drops below the area of the controller, a pump is activated to permit water to enter tank 11. When the water level rises above the level of the flow controller, the pump is deactivated. A float controller is very useful, with the float controller operating a relay which will switch on and off the feed water pump and optionally the air compressor via a time delay switch. The water to be treated will flow by gravity through the system depending on the water level in tank 11 or in reservoir 21 depending on the location of the water flow controller. When water is pumped for use from reservoir 21, the water level in each stripper chamber and in storage tank 11 drops. This then activates the input pump. This is a simple control technique for the apparatus. However, if desired, more extensive controls can be used. These could include controls on storage reservoir 21 and each stripper chamber. This will provide for a faster reaction to a drawing down of the storage reservoir; however, the increased capital cost and the resulting decrease in overall reliability are trade-offs which would have to be considered.

The stripping air can be at ambient temperature or heated and can be fed to the apparatus on a continuous basis. This would provide for highly purified water and would prevent any bacterial growth in the apparatus. This is particularly the case when the input air steam is an ozonized air. Ozonized air would contain up to about 5 weight percent ozone. Any conventional ozone generator such as those sold by The American Electroaire Company can be used. This ozone generator can be placed in series so that all of the air passes through the ozone generator, or can be in parallel so that only a portion of the air flows through the ozone generator. Where it is desired to have an intermittent flow of air, the air compressor can be activated the same time as the water pump, but using a time switch, allowed to continue to flow air through the strippers for a period of time of up to about 5 minutes after the water pump is deactivated.

The apparatus in each instance is shown with a storage reservoir. A storage reservoir will be required in most installations. However, where a structure has extensive plumbing between this apparatus and the point of use, this plumbing can serve as the storage reservoir. That is, some plumbing installations will hold from 10 to 50 gallons of water. In those instances, the water flows from the last stripper chamber through the optional adsorbent bed chamber and directly to usage.

Vapor recovery is an option. Where the organic content of the water is high, or where large volumes of water are being treated, the effluent air containing the organic vapors can be passed through a chiller or an adsorbent bed to recover the organics. A chiller can use the cold input water, solid or liquid carbon dixoide or liquid nitrogen. Suitable adsorbents include activated carbon and Zeolites such as Zeolite A or Zeolite X.

This same apparatus and process can on a large scale be used to clean the water in a contaminated aquifer. In such a case the water is pumped from one point in the aquifer to the surface subjected to air stripping in a plurality of stripper chambers and then injected back down into the aquifer at a point which is remote from the point the water was taken from the aquifer. No storage reservoir is required in this use. This technique is particularly useful where the contamination is moving across the aquifer. In that case the contaminated water is removed just behind the contaminated water front, treated and pumped back into the aquifer on the other side of the contaminated water front. This then causes the contaminated water front to recede. Tapping points into the aquifer are changed as the contaminated water front recedes to the source of the contamination.

Various plumbing modifications can be made to the apparatus as shown. For instance, the water feed inlet into several stripper chambers should be placed lower in each successive stripper chamber equivalent at least to the internal diameter of the conduit. This will ensure gravity flow from chamber to chamber. Additionally the air feed supply should have at least one point above the top of the stripper chambers. This will aid in preventing water flow to the air compressor. Also additional water treatment devices can be added after the apparatus. These include water softeners, denitrifiation devices and the like. These would be positioned similar to the adsorbent bed in FIG. 4. The various modifications of these kinds are considered to be within the concept of the present apparatus and process.

What I claim is:

1. An apparatus for removing hydrocarbon contaminants from water comprising:
   (a) a plurality of tubular chambers interconnected in series relationship to flow water therethrough with a water input means at one end and a water outlet means at the other end of each tubular chamber;
   (b) first pump means to flow a contaminated water through a first water conduit means to the first of said plurality of tubular chambers, said first pump means being controlled by the water level in the last of said plurality of tubular chambers;
   (c) second water conduit means at the other end of the last of said plurality of tubular chambers to flow a purified water to a reservoir;
   (d) each of said plurality of tubular chambers having at the lower portion thereof means for injecting air into the water contained therein and at the upper end thereof outlet means for said injected air;
   (e) means connecting the air outlet means of one tubular chamber with the air inlet means of the adjacent tubular chamber; and
   (f) compressor means controlled by the level of water in the last of said plurality of chambers with conduit means to flow the compressed air to the last of said plurality of chambers.

2. An apparatus for removing hydrocarbon contaminants from water as in claim 1, wherein said second water conduit means flows water to an adsorbent chamber and then to said reservoir.

3. An apparatus for removing hydrocarbon contaminants from water as in claim 2 wherein said air conduit means contains an ozone generating means whereby said injected air contains ozone.

4. An apparatus for removing hydrocarbon contaminants from water as in claim 2 wherein the adsorbent in said adsorbent chamber is carbon.

5. An apparatus for removing hydrocarbon contaminants from water as in claim 1 wherein said air conduit means contains an ozone generating means whereby said injected air contains ozone.

* * * * *